United States Patent [19]

Huiskes et al.

[11] Patent Number: 4,716,337
[45] Date of Patent: Dec. 29, 1987

[54] FLUORESCENT LAMP

[75] Inventors: Cornelis Huiskes; Evert D. Schutten, both of Roosendaal, Netherlands

[73] Assignee: U.S. Philips Corporation, New York, N.Y.

[21] Appl. No.: 720

[22] Filed: Jan. 6, 1987

[30] Foreign Application Priority Data

Jan. 8, 1986 [NL] Netherlands .......................... 8600023

[51] Int. Cl.$^4$ .......................... H01J 61/44; H01J 61/48
[52] U.S. Cl. ..................................................... 313/487
[58] Field of Search ......................................... 313/487

[56] References Cited

U.S. PATENT DOCUMENTS 4,602,188 7/1986 De Hair et al. ...................... 313/487
4,644,223 2/1987 De Hair et al. ...................... 313/487

Primary Examiner—Palmer C. DeMeo
Attorney, Agent, or Firm—John C. Fox

[57] ABSTRACT

Low-pressure mercury vapor discharge lamp having a very satisfactory color rendition and a color temperature from 2300 to 3300 K. The lamp is provided with a luminescent layer comprising:

(a) a luminescent alkaline earth metal halophosphate activated by $Sb^{3+}$ and $Mn^{2+}$ and having a color temperature of 2900–5000 K.;
(b) a luminescent material activated by $Eu^{2+}$ and having an emission maximum of 470–500 nm;
(c) a luminescent rate earth metal metaborate activated by $Ce^{3+}$ and $Mn^{2+}$ and having a red $Mn^{2+}$ emission, and
(d) a luminescent aluminate activated by $Ce^{3+}$ and having a garnet crystal structure absorbing blue radiation below 480 nm;
(e) a green luminescing $Mn^{2+}$ activated material having an emission maximum in the range from 510 to 535 nm. As a result of the addition of the material e the quantity of the material d can be limited so that color point differences among the lamps are avoided.

8 Claims, 1 Drawing Figure

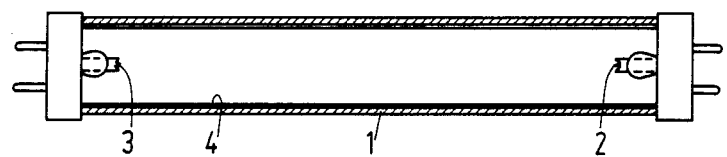

FLUORESCENT LAMP

BACKGROUND OF THE INVENTION

The invention relates to a low-pressure mercury vapour discharge lamp having a very satisfactory colour rendition, a colour temperature of the emitted white light in the range from 2300 to 3300 K. and a colour point on or near the Planckian locus, which lamp comprises a gas-tight radiation emitting envelope comprising mercury and a rare gas, and a luminescent layer comprising:

(a) at least one luminescent alkaline earth metal halophosphate activated by trivalent antimony and by bivalent manganese with a colour temperature of the emitted radiation from 2900 to 5000 K.;

(b) at least one luminescent material activated by bivalent europium having an emission maximum in the range from 470 to 500 nm and a half-value width of the emission band of not more than 90 nm;

(c) a luminescent rare earth metal metaborate activated by trivalent cerium and by bivalent manganese and having a monoclinic crystal structure whose fundamental lattice is defined by the formula $Ln(Mg,Zn,Cd)B_5O_{10}$ in which Ln represents at least one of the elements yttrium, lanthanum and gadolinium and in which up to 20 mol.% of the B may be replaced by Al and/or Ga, which metaborate had a red $Mn^{2+}$ emission; and (d) a luminescent aluminate activated by trivalent cerium and having a garnet crystal structure at least partly absorbing blue radiation at wavelengths below 480 nm.

Lamps of this type are known from Netherlands Patent Application No. 8301445, to which U.S. patent application Ser. No. 814,284 corresponds. A very good colour rendition is obtained with these lamps, that is to say the average colour rendering index R (a,8) has a value of at least 85 at a low colour temperature of the emitted radiation. In practice R(a,8) values of even 95 and more may be reached. To this end the emission of a number of luminescent materials must be combined in these lamps. In the first place the lamps comprise a luminescent metaborate having a red $Mn^{2+}$ emission (the material a) together with a material activated by bivalent europium having an emission maximum in the range from 470 to 500 nm and a half-value width of not more than 90 nm (the material b) and a luminescent halophosphate (the material a). Lamps for colour temperatures of approximately 3200 K. and more can be made with such a combination of luminescent materials. In order to obtain lower colour temperatures, the lamps are provided in the second place with a luminescent aluminate activated by trivalent cerium and having a garnet structure (the material d) which serves as means to absorb blue radiation and to convert it into useful radiation having longer wavelengths.

A great advantage of these known lamps is that they have a high luminous flux and only a slight decline of the luminous flux during their lifetime. This is also the case at relatively high radiation loads in lamps having a small diameter for example an internal diameter of 24 mm. A further advantage is that low to very low colour temperatures (to approximately 2300 K.) can be obtained. This is particularly the case if a $Tb^{3+}$ activated material is added to the luminescent layer. All mentioned luminescent materials may be provided as a homogeneous mixture in the luminescent layer. It is also possible to build up the luminescent layer from partial layers in which one or more of the luminescent materials is provided in a layer, which layer is coated by a second layer comprising the other materials. For example, the blue absorbing luminescent garnet may be provided on the inner wall of the lamp envelope in the form of a thin layer and a layer may be provided thereon which consists of a homogeneous mixture of the other luminescent materials.

A drawback of the known lamps is that they may have mutual differences in the colour point of the emitted radiation. This is a result of the presence of the luminescent garnet. In fact, it has been found that the very small spread in the thickness of the luminescent layer occurring during production of the lamp leads to the said colour point differences, more specifically to a greater extent as the layer comprises more of the garnet.

It is an object of the invention to provide low-pressure mercury vapour discharge lamps having a very satisfactory colour rendition at a low colour temperature, in which the said drawback of a spread in the colour point is substantially eliminated or is reduced to a minimum.

SUMMARY OF THE INVENTION

According to the invention to this end a low-pressure mercury vapour discharge lamp of the type described in the opening paragraph is characterized in that the luminescent layer also comprises: (e) a green luminescing material activated by bivalent manganese having an emission maximum in the range from 510 to 535 nm.

It has been found that at a given colour point of the radiation emitted by the lamp an addition of green $Mn^{2+}$ emission by means of the material e results in a reduction of the quantity of the luminescent garnet. The high value of R(a,8) is maintained, which was not to be expected at all. In fact, it appears from the aforementioned Netherlands Patent Application No. 8301445 that an increase of the green $Tb^{3+}$ emission leads to a reduction of the quantity of luminescent garnet, but is accompanied by an unacceptable decrease of the R(a,8) value. An advantage of the lamps according to the invention is that due to the reduced quantity of the luminescent garnet the thickness of the luminescent layer has less influence on the colour point of the emitted radiation so that colour point differences among the lamps themselves are reduced to a minimum.

Lamps according to the invention are preferred in which the luminescent layer also comprises a luminescent material activated by trivalent terbium (the material f) which has a green $Tb^{3+}$ emission. As is the case in the known lamps, such a material f has the advantage that a higher luminous flux is obtained with the lamps and that lower colour temperatures can be achieved. In lamps according to the invention, however, part of the radiation contribution in the green part of the spectrum originates from the $Mn^{2+}$ activated material e, so that a high R(a,8) value is ensured.

Lamps according to the invention are advantageously used in which the luminscent metaborate c is also activated by trivalent teribum and the metaborate c is also the material f and is defined by the formula $(Y,La,Gd)_{1-x=y}Ce_xTb_y(Mg,Zn,Cd)_{1-p}Mn_pB_5O_{10}$ in which $0.01 \leq x \leq 1-y$ $0.01 \leq y \leq 0.75$ $$0.01 \leq p \leq 0.30$$

and in which up to 20 mol.% of the B many be replaced by Al and/or Ga. These lamps have the advantage that both the red $Mn^{2+}$ emission and the green $Tb^{3+}$ emission are provided by one luminescent material. The desired relative contribution of these emissions can be adjusted by varying the concentrations of Mn and Tb in the metaborate.

Lamps according to the invention are preferred in which the material d is defined by the formula $Ln_{3-x}Ce_xAl_{5-p-q}Ga_pSc_qO_{12}$ in which Ln represents at least one of the elements yttrium, gadolinium, lanthanum and lutetium and in which $$0.01 \leq x \leq 0.15$$

$$0 \leq p \leq 3$$

$$0 \leq q \leq 1.$$

Such luminescent garnets have eminent absorption properties in the blue part of the spectrum and yield a satisfactory contribution to the luminous flux of the lamp, particularly if $p=q=0$ is chosen.

An advantageous embodiment of a lamp according to the invention is characterized in that the material e is at least a material from the group of the $Mn^{2+}$ activated zinc orthosilicates, the $Eu^{2+}$ and $Mn^{2+}$ activated barium aluminates having a hexagonal crystal structure and the $Eu^{2+}$ and $Mn^{2+}$ activated barium magnesium aluminates having a hexagonal crystal structure. The said silicates (for example $Zn_2SiO_4;Mn^{2+}$, willemite) and hexagonal aluminates are known luminescent materials which have a very efficient comparatively narrow band $Mn^{2+}$ emission with a maximum in the range from 510 to 535 nm. Such lamps are preferred which are characterized in that the luminescent layer comprises the material e in a quantity of 1 to 20% by weight.

Lamps according to the invention are preferably used which are characterized in that the luminescent layer consists of a homogeneous mixture of the luminescent materials. A luminescent layer consisting of such a mixture can be more easily provided in the lamp than a luminescent layer consisting of partial layers.

A very advantageous embodiment of a lamp according to the invention in which the luminescent layer consists of a homogeneous mixture and is located on the inner wall of the envelope is characterized in that a second luminescent layer is located between the luminescent layer and the envelope, which second luminescent layer comprises a mixture of a luminescent $Sb^{3+}$ and $Mn^{2+}$ activated alkaline earth metal halophosphate having a colour temperature of the emitted radiation from 2900 to 5000 K. and a luminescent $Ce^{3+}$ activated aluminate having a garnet crystal structure. Such a lamp has the advantage that the thickness of the first luminescent layer may be smaller so that a smaller quantity of the relatively costly luminescent materials present in this layer is required for each lamp. The quantity of the luminescent garnet present in the second luminescent layer is preferably chosen to be substantially as large as the quantity of this garnet in the first luminescent layer and the colour point of the radiation emitted by the second luminescent layer only is chosen to be as close as possible to the desired colour point of the lamp.

Embodiments of lamps according to the invention will now be further described with reference to a drawing.

BRIEF DESCRIPTION OF THE DRAWING

The drawing diagrammatically shows in a cross-section a low-pressure mercury vapour discharge lamp according to the invention.

DESCRIPTION OF THE PREFERRED EMBODIMENTS

In the sole FIGURE of the drawing, the reference numeral 1 denotes the glass wall of the low-pressure mercury vapour discharge lamp. Electrodes 2 and 3 between which the discharge takes place during operation of the lamp are provided at the ends of the lamp. The lamp contains a rare gas which serves as an ignition gas and furthermore contains a small quantity of mercury. The lamp has a length of 120 cm and an internal diameter of 24 mm and is intended to consume a power of 36 W during operation. The inner side of the wall 1 is coated with a luminescent layer 4 comprising the luminescent materials a, b, c, d and e. The layer 4 may be provided in a conventional manner on the wall 1, for example, by means of a suspension comprising the luminescent materials.

In the following embodiments of lamps according to the invention and in lamps which were made for the purpose of comparison luminescent materials were used which are indicated in the table below. In addition to the formula for each material, the table also states the colour point (x,y) of the radiation emitted by each of these materials if the material is used as the only luminescent material in a lamp. In addition to the materials mentioned in the table, a luminescent garnet (YAG) defined by the formula $Y_{2.9}Ce_{0.1}Al_5O_{12}$ was also used.

| luminescent material | formula | x | y |
|---|---|---|---|
| CBTM | $Ce_{0.2}Gd_{0.6}Tb_{0.2}Mg_{0.91}Mn_{0.09}B_5O_{10}$ | 0.518 | 0.345 |
| CBT | $Ce_{0.2}Gd_{0.6}Tb_{0.2}MgB_5O_{10}$ | 0.324 | 0.535 |
| SAE | $Sr_{0.98}Eu_{0.02}Al_{3.5}O_{6.25}$ | 0.151 | 0.364 |
| Halo 2900 | $Ca_{9.33}Cd_{0.12}(PO_4)_6F_{1.7}Cl_{0.4}$; $Sb_{0.125}Mn_{0.35}$ | 0.437 | 0.402 |
| Willemite | $Zn_2SiO_4; Mn^{2+}$ | 0.246 | 0.614 |

Example 1

Lamps of the type shown in the drawing were provided with a luminescent layer (approximately 4 grams per lamp) consisting of a homogeneous mixture of
  71.4% by weight of CBTM
  9% by weight of SAE
  15% by weight of Halo 2900
  4.6% by weight of willemite.
Furthermore the mixture comprised 10 grams of YAG per 100 grams of the said materials.

A colour temperature of approximately 2700 K. and an R(a,8) of 93 were measured on the lamps. The average values of the colour coordinates of the colour point were x=0.461 and y=0.414. The spread of the values of x and y among the lamps themselves was less than 0.005 so that no disturbing colour point differences were observed.

Example 2

Lamps of the same type as described in Example 1 were provided with a luminescent layer (approximately 4 grams per lamp) consisting of a homogeneous mixture of
- 68% by weight of CBTM
- 9% by weight of SAE
- 18% by weight of Halo 2900
- 5% by weight of willemite.

Furthermore the mixture comprised 9 grams of YAG per 100 grams of the said materials.

A colour temperature of approximately 2700 K. and an R(a,8) of 93 were measured on the lamps. The colour point had the coordinates x=0.461 and y=0.411 in which the spread was again less than 0.005.

Comparative Examples

For the purpose of comparison several series of lamps were manufactured which did not comprise a green luminescing $Mn^{2+}$ activated material (not according to the invention) but which were otherwise completely analogous to the lamps according to Examples 1 and 2 (with the same colour temperature of approximately 2700 K. and substantially the same colour point).

(a) Lamps were provided with a homogeneous mixture of
- 74% by weight of CBTM
- 19% by weight of SAE
- 7% by weight of Halo 2900 in a luminescent layer (approximately 4 grams per lamp) which furthermore comprised 16 grams of YAG per 100 grams of these luminescent materials. This relatively large quantity of YAG was required to achieve the desired colour point. The lamps had an R(a,8) value of approximately 95. The spread in both the x and y coordinates of the colour point of the lamps was, however, approximately 0.008 so that troublesome colour point differences among the lamps were noticeable.

(b) Lamps were provided with a homogeneous mixture of
- 69.1% by weight of CBTM
- 10% by weight of SAE
- 18% by weight of Halo 2900
- 2.9% by weight of CBT.

As a result of the extra contribution in the green part of the spectrum by the addition of CBT, a smaller quantity of YAG was required (namely 13 grams per 100 grams of the said luminescent materials) in order to achieve the desired colour point in these lamps, as compared with the series (a). The quantity of YAG was, however, still so large that a disturbing spread in the colour point occurred. Furthermore, the R(a,8)-value had decreased to 92.

(c) Lamps were provided with a homogeneous mixture of
- 68.3% by weight of CBTM
- 9% by weight of SAE
- 18% by weight of Halo 2900
- 4.7% by weight of CBT.

Due to the relatively large extra contribution in the green part of the spectrum by CBT, only 9 grams of YAG were required per 100 grams of the other luminescent materials to achieve the desired colour point in these lamps. The R(a,8) of these lamps had, however, decreased to values of approximately 88 which is unacceptably low for practical uses for which very strict requirements are imposed on the colour rendition.

What is claimed is:

1. A low-pressure mercury vapour discharge lamp having a very satisfactory colour rendition, a colour temperature of emitted white light in the range from 2300 to 3300 K. and a colour point on or near the Planckian locus, said lamp having a gas-tight radiation emitting envelope containing mercury and a rare gas, and a luminescent layer comprising:
   a. at least one luminescent alkaline earth metal halophosphate activated by trivalent antimony and by bivalent manganese with a colour temperature of the emitted radiation from 2900 to 5000 K.;
   b. at least one luminescent material activated by bivalent europium having an emission maximum in the range from 470 to 500 nm and a half-value width of the emission band of not more than 90 nm;
   c. a luminescent rare earth metal metaborate activated by trivalent cerium and by bivalent manganese and having a monoclinic crystal structure whose fundamental lattice is defined by the formula $Ln(Mg,Zn,Cd)B_5O_{10}$, in which Ln represents at least one of the elements yttrium, lanthanum and gadolinium, and in which up to 20 mol. % of the B may be replaced by Al and/or Ga, which metaborate has a red $Mn^{2+}$ emission; and
   d. a luminescent aluminate activated by trivalent cerium and having a garnet crystal structure at least partly absorbing blue radiation at wavelengths below 480 nm, characterized in that the luminescent layer also comprises:
   e. a green luminescing material activated by bivalent manganese having an emission maximum in the range from 510 to 535 nm.

2. A lamp as claimed in claim 1, in which the luminescent layer also comprises a luminescent material (f) activated by trivalent terbium and having a green $Tb^{3+}$ emission.

3. A lamp as claimed in claim 2, in which the luminescent metaborate c is also activated by trivalent terbium and the metaborate c is also the material f and is defined by the formula $(Y,La,GD)_{1-x-y}Ce_xTb_y(Mg,Zn,Cd)_{1-p}Mn_pB_5O_{10}$, in which $0.0123 \ x \leq 1-y$ $0.01 \leq y \leq 0.75$ $0.01 \leq p \leq 0.30$, and in which up to 20 mol. % of the B may be replaced by Al and/or Ga.

4. A lamp as claimed in claim 1 in which the material d is defined by the formula $Ln_{3-x}Ce_xAl_{5-p-q}Ga_pSc_qO_{12}$ in which Ln represents at least one of the elements yttrium, gadolinium, lanthanum and lutetium and in which $0.01 \leq x \leq 0.15$ $0 \leq p \leq 3$ $0 \leq q \leq 1$.

5. A lamp as claimed in claim 1, characterized in that the material e is at least a material from the group of the zinc orthosilicates activated by bivalent manganese, the barium aluminates activated by bivalent europium and by bivalent manganese and having a hexagonal crystal structure, and the barium magnesium aluminates activated by bivalent europium and by bivalent manganese and having a hexagonal crystal structure.

6. A lamp as claimed in claim 5, characterized in that the luminescent layer comprises the material e in a quantity of 1 to 20% by weight.

7. A lamp as claimed in claim 1, characterized in that the luminescent layer consists of a homogeneous mixture of the luminescent materials.

8. A lamp as claimed in claim 7, in which the luminescent layer is located on the inner wall of the envelope, characterized in that a second luminescent layer is located between the luminescent layer and the envelope, which second luminescent layer comprises a mixture of a luminescent alkaline earth metal halophosphate activated by trivalent antimony and by bivalent manganese and having a colour temperature of the emitted radiation from 2900 to 5000 K. and a luminescent aluminate activated by trivalent cerium and having a garnet crystal structure.

* * * * *